INVENTOR
LEWIS G. LAKIN

ATTYS.

3,207,163
HUSKING ROLL
Lewis G. Lakin, Chicago, Ill., assignor to A. Lakin & Sons, Inc., Chicago, Ill., a corporation of Illinois
Filed Mar. 9, 1964, Ser. No. 350,217
5 Claims. (Cl. 130—5)

The present invention relates to a novel roll construction, particularly adapted for use as a corn husking roll.

The roll of the present invention is constructed of a plurality of relatively flexible resilient discs constructed and arranged in a novel manner on a relatively rigid shaft rendering the assembly of enhanced effectiveness in corn husking.

The component discs of the roll of the present invention are composed of a fabric reinforced rubber facing thickness and a contiguous fabric-free rubber backing thickness, the peripheral edge portions of such discs being tapered or beveled in a direction extending from the outer face of their backings inwardly to the defining face of their fabric-free facings.

Although not limited thereto, a convenient source of the discs is from automobile tire carcasses composed of the fabric reinforced rubber thickness and a fabric-free rubber thickness. The aforesaid construction leaves edges of greatest diameter, or the high points of the discs of fabric-free rubber construction enhancing the husking operation by means of the fabric-free rubber projections, while at the same time the remainder of the disc remains reinforced by means of the contained fabric. Lamination of a plurality of discs of the aforesaid character in front to back disposition on a rigid shaft furthermore provides an uneven surface for better husking.

The discs of the present invention are further provided with scalloped or notched peripheral edge portions, leaving disposed between them regularly spaced teeth. Adjacent discs are arranged on the shaft in a manner such that the notches and teeth are regularly staggered; that is to say, the teeth of one disc overlie the notches of the adjacent disc. In addition to aiding in providing an uneven surface for better husking this staggered relationship of the discs and their toothed formation provides a grain effect, the discs being maintained in said alignment on the shaft in a firm manner.

Other objects and advantages of the present invention, its details of construction, and arrangement of parts, will be apparent from a consideration of the following specification and accompanying drawings, wherein FIG. 1 is a right-hand end elevational view of the roll of the present invention.

Figure 1:
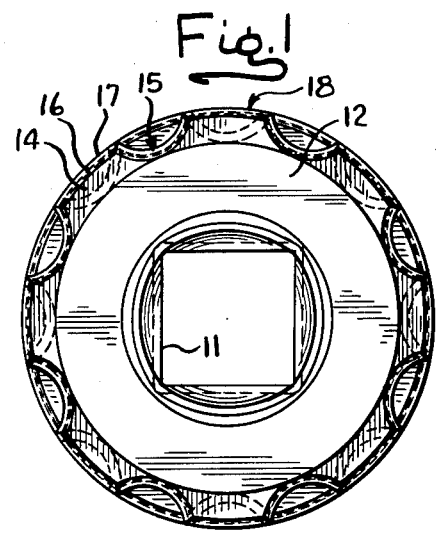
Figure 2:
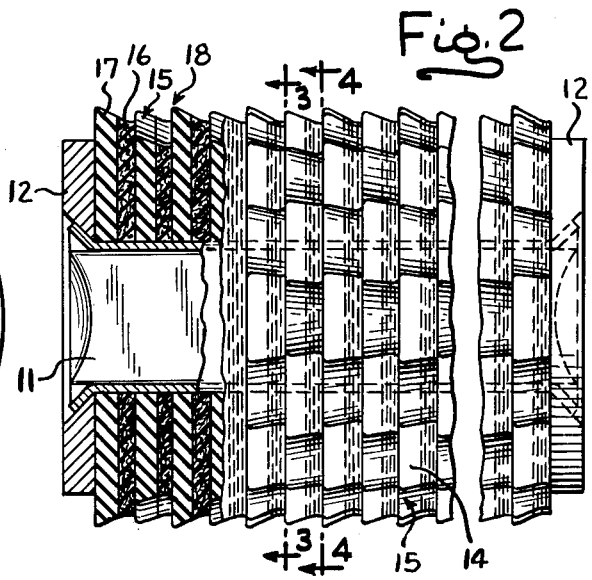
FIG. 2 is a fragmentary side elevational view of the roll of the present invention partly in section.

As best shown in FIG. 2, a plurality of discs generally indicated as 10 are held under compression on a shaft 11 between an opposed pair of end compression plates 12. The plates 12 on shaft 11 at each end of the roll maintain the discs 10, which are of flexible resilient composition, under compression on the shaft, the latter being flared over at its ends against a bevel on the plates 12 as shown.

Figure 3:
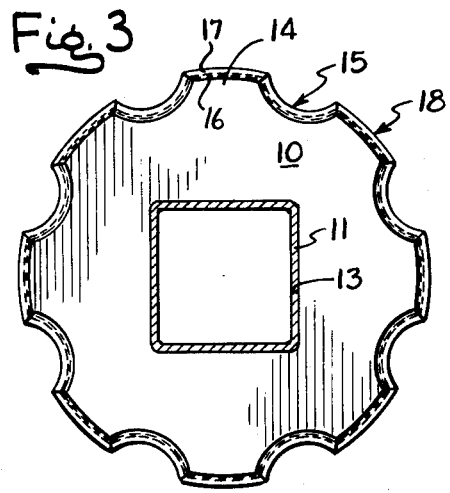
FIG. 3 is a section on the line 3—3 of FIG. 2 showing a front elevational view of one of the component discs of the present invention.
Figure 4:
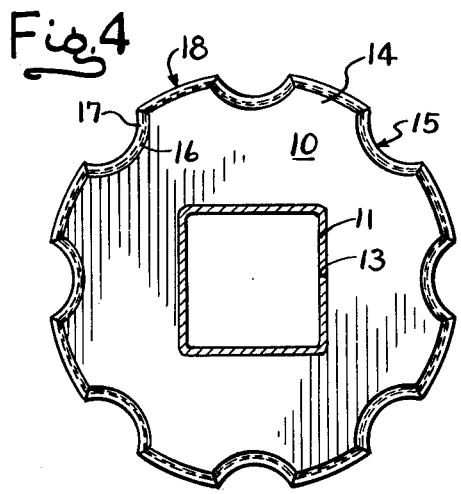
FIG. 4 is a section on the line 4—4 of FIG. 2 showing a front elevational view of an adjacent one of the discs of the present invention.

For securing the discs on the shaft in fixed position against relative rotation thereon and to maintain them in staggered relationship, the shaft is suitably of angular or square cross section and the discs are formed with matching apertures. As will be noted from FIGS. 3 and 4, the disc 10 in FIG. 4 has its opening 13 angularly offset from that of the disc of FIG. 3, so that when arranged on the shaft 11 the teeth 14 of one disc will be offset from the teeth 14 of an adjacent disc such that they are regularly staggered, with the teeth of one disc overlying the notches 15 of the adjacent disc.

As previously indicated, the discs are each composed of a fabric reinforced rubber facing thickness 16 and a fabric-free rubber backing thickness 17. The discs are further beveled or tapered in a direction extending inwardly from the backing towards the fabric reinforced facing, the latter being of the smallest diameter, leaving projecting at the largest diameter peripheral fabric-free rubber teeth edges 18. These fabric-free rubber edges of the teeth 14 provide the outermost periphery or points of greatest diameter of a composite roll defining a serrated impact face on the roll, providing enhanced husking with minimum damage to the husked corn kernels. The staggered arrangement of the discs on the shaft and the aforesaid high fabric-free points on the discs provides overall enhanced husking effect.

It will be understood that while only one roll has been shown, a pair of rolls is employed in juxtaposed position, and with the construction and arrangement of the component rolls as hereinbefore described better purchase may be had upon the husks being passed in contact with the juxtaposed pair of said rolls.

Although I have shown and described the preferred embodiment of my invention, it will be understood by those skilled in the art that changes may be made in the details thereof without departing from its scope as comprehended by the following claims.

I claim:

1. A roll comprising a rigid elongated central core and a plurality of relatively flexible resilient discs carried thereon under axial compression, said discs being composed of a fabric reinforced rubber facing thickness and a contiguous fabric-free rubber backing thickness and disposed on said shaft in face to back relationship to each other, the peripheral edge portions of said discs being tapered in a direction extending from the outer face of their backings inwardly to the outer defining face of their facings.

2. A corn husking roll comprising a rigid elongated central core and a plurality of relatively flexible, resilient discs carried by said core under axial compression thereon, said discs being of substantially uniform thickness and composed of a fabric-reinforced rubber facing thickness and a fabric-free rubber backing thickness and disposed on said shaft in face to back relationship to each other, the peripheral edge portions of said discs being axially beveled in a direction extending inwardly towards said facings with their apexes at the backings free of said reinforcement defining a serrated impact face on said roll.

3. A corn husking roll comprising a rigid elongated central core and a plurality of relatively flexible, resilient discs carried by said core under axial compression thereon, said discs being of substantially uniform thickness and composed of a fabric-reinforced rubber facing thickness and a fabric-free rubber backing thickness and disposed on said shaft in face to back relationship to each other, the peripheral edge portions of said discs being axially beveled in a direction extending inwardly towards said facings with their apexes at the backings free of said reinforcement defining a serrated impact face on said roll, the discs being formed with regularly staggered peripheral notches.

4. A corn husking roll comprising a rigid elongated central core of angular cross section and a plurality of relatively flexible, resilient discs carried by said core under axial compression thereon, said discs being formed with peripheral notches defining regularly spaced radial teeth and composed of a fabric reinforced rubber facing thickness and a contiguous fabric-free rubber backing thickness and disposed on said shaft in face to back relationship with the teeth on one disc overlying the notches of the adjacent discs, the peripheral edge portions of said teeth being axially beveled in a direction extending inwardly towards said facings with their apexes at the facings free of said reinforcement defining a serrated impact face on said roll.

5. A corn husking roll comprising a rigid elongated central core and a plurality of relatively flexible, resilient discs carried by said core under axial compression thereon, said discs being of substantially uniform thickness cut from rubber tire casings and composed of a fabric-reinforced rubber facing thickness and a fabric-free rubber backing thickness and disposed on said shaft in face to back relationship to each other, the peripheral edge portions of said discs being axially beveled in a direction extending inwardly towards said facings with their apexes at the backings free of said reinforcement defining a serrated impact face on said roll, the discs being formed with regularly spaced peripheral notches.

References Cited by the Examiner

UNITED STATES PATENTS

| | | | |
|---|---|---|---|
| 2,416,124 | 2/47 | Siemen | 130—5 |
| 2,444,088 | 6/48 | Becker | 130—5 |
| 2,690,752 | 10/54 | Lakin | 130—5 |
| 2,737,185 | 3/56 | Siemen | 130—5 |
| 3,137,919 | 6/64 | Lakin | 130—5 X |

ABRAHAM G. STONE, *Primary Examiner.*
ANTONIO F. GUIDA, *Examiner.*